(12) United States Patent
Paradies et al.

(10) Patent No.: US 9,934,324 B2
(45) Date of Patent: Apr. 3, 2018

(54) INDEX STRUCTURE TO ACCELERATE GRAPH TRAVERSAL

(71) Applicants: Marcus Paradies, Walldorf (DE); Michael Rudolf, Heidelberg (DE); Christof Bornhoevd, Palo Alto, CA (US); Wolfgang Lehner, Dresden (DE)

(72) Inventors: Marcus Paradies, Walldorf (DE); Michael Rudolf, Heidelberg (DE); Christof Bornhoevd, Palo Alto, CA (US); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 719 days.

(21) Appl. No.: 14/308,172

(22) Filed: Jun. 18, 2014

(65) Prior Publication Data
US 2015/0370838 A1 Dec. 24, 2015

(51) Int. Cl.
*G06F 17/30* (2006.01)

(52) U.S. Cl.
CPC .............................. *G06F 17/30958* (2013.01)

(58) Field of Classification Search
None
See application file for complete search history.

(56) References Cited

U.S. PATENT DOCUMENTS

| | | | |
|---|---|---|---|
| 8,380,701 B1 * | 2/2013 | Konik | G06F 17/30336 707/713 |
| 2008/0243811 A1 * | 10/2008 | He | G06F 17/30616 |
| 2008/0320214 A1 * | 12/2008 | Ma | G06F 3/0613 711/103 |
| 2013/0018922 A1 * | 1/2013 | Schmidt | G06N 5/003 707/797 |
| 2015/0052134 A1 * | 2/2015 | Bornea | G06F 17/30598 707/737 |
| 2015/0120745 A1 * | 4/2015 | James | G06F 17/30306 707/741 |
| 2016/0314196 A1 * | 10/2016 | Harter | G06F 17/30678 |

\* cited by examiner

*Primary Examiner* — Christopher J Raab
(74) *Attorney, Agent, or Firm* — Sterne, Kessler, Goldstein & Fox P.L.L.C.

(57) ABSTRACT

A system, computer-implemented method, and computer-readable storage medium for generating a block-based index, are provided. A block index is generated where the block index comprises a plurality of blocks and a block corresponds to a section of a graph column that stores a value. A block range vector is also generated for the index where the block range vector includes range information for the block that corresponds to the section of the graph and where the block-based index facilitates traversal of the graph column that searches for the value by constraining the traversal to the section of the graph.

15 Claims, 10 Drawing Sheets

400

Index lookup function

Input : Set of values S.
Output: Set of blocks C with range information.

1 begin
2  forall the $s_i \in S$ do
3   $B \leftarrow \text{bi}[s_i]$;
4   forall the $k \in B$ do
5    $C \leftarrow C \cup \langle k, \text{brv}[k-1]+1, \text{brv}[k]\rangle$;

Level synchronous traversal algorithm with a column-oriented index

Input : Traversal configuration $\kappa = (S_m, E_a, c, r, d)$.
Output: Set of discovered vertices $R$.

1 begin
2    if $c = 0$ then
3       $R \leftarrow S_m$; // Add start vertices to result
4    $p \leftarrow 1$; $D_w \leftarrow S_m$;
5    while $p \leq r$ do
6       if $D_w = \emptyset$ then
7          return; // No more vertices to discover
8       $P \leftarrow \emptyset$
9       $B \leftarrow \emptyset$
10      // Set of blocks
11      $V_s$.lookup$(D_w, B)$;
12      forall the $b_i \in B$ do
13         $V_s$.scanBlock$(b_i.start, b_i.end, D_w, E_a, P)$;
14      $D_w \leftarrow \emptyset$; // Reset working vertex set
15      $V_t$.materialize$(P, D_w)$; // Materialize vertices from $P$
16      if $p \geq c$ then
17         $R \leftarrow R \cup D_w$; // Add vertices from $D_w$ to result $R$
18      $p \leftarrow p + 1$;

return $R$;

FIG. 6

INDEX STRUCTURE TO ACCELERATE GRAPH TRAVERSAL

BACKGROUND

Background Art

Generally, a data graph represents data from multiple domains in an expressive and flexible way. For example, a data graph can show relationships between different data objects, and relationships between data objects and properties of these objects. These relationships may be mapped to vertices and edges in the data graph.

BRIEF DESCRIPTION OF THE DRAWINGS

The accompanying drawings are incorporated herein and form a part of the specification.

FIG. 4 is exemplary pseudo code of a look-up function for looking up a value in a column using a block-based index, according to an embodiment.

FIG. 6 is exemplary pseudo code of a level synchronous traversal algorithm on a column with a block-based index, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for generating an index that accelerates a traversal in a column-oriented storage in a database management system.

Figure 1:
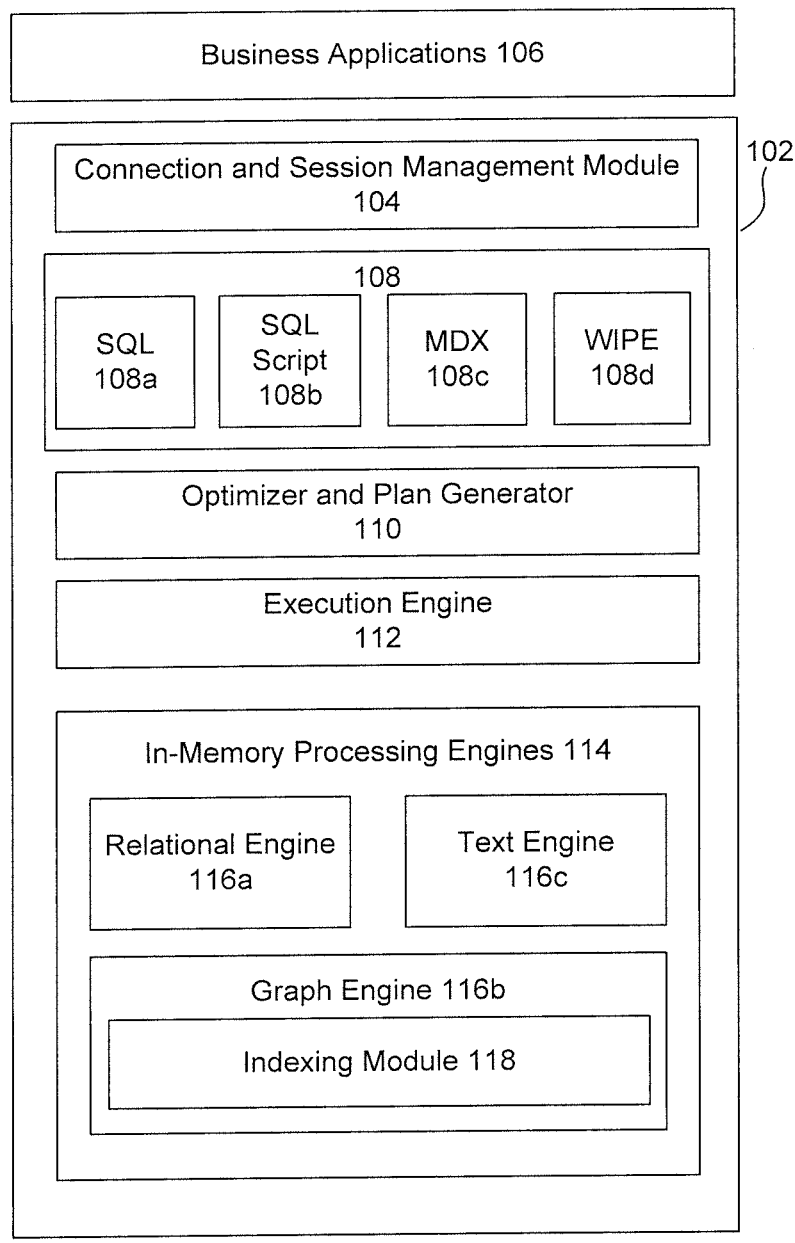
FIG. 1 is a block diagram of a database management system, according to an embodiment.

FIG. 1 is a block diagram 100 of a database management system, according to an embodiment. Database management system 102 may be a memory-centric data management system that leverages hardware capabilities, such as, but not limited to vast main memory space, multi core CPUs and GPU processors, and solid state drive (SSD) storage.

In an embodiment, database management system 102 includes connection and session management module 104. Connection and session management module 104 creates and manages sessions and connections for database clients. Database clients may be computing devices under a control of a user (also referred to as client devices) that access and/or execute business applications 106. Business applications 106 are custom or generic applications that include applications related to social media, bio-informatics, and business processing, to name a few examples. Connection and session management module 104 also receives different queries, including graph queries, that database clients issue to database management system 102 and transmits the results of the queries back to the database clients.

Once connection and session management module 104 establishes a session, database clients may use database languages 108, to manipulate data associated with business applications 106. Example database languages 108 include structured query language (SQL) 108a, SQL Script 108b (a scripting language for describing application specific calculations inside the database), MultiDimensional eXpressions (MDX) 108c, and WIPE (for data graph processing) 108d, to give a few examples.

In an embodiment, optimizer and plan generator 112 parses and optimizes client requests that, for example, may be made using database languages 108. For example, optimizer and plan generator 110 may generate an execution plan for executing a client request in database management system 102. Once generated, optimizer and plan generator 110 passes the execution plan to execution engine 112.

In an embodiment, execution engine 112 invokes an in-memory processing engine 116 to process the execution plan. Execution engine 112 may invoke a different in-memory processing engine 114 based on the execution plan type. Example in-memory processing engines 116 include a relational engine 116a, a graph engine 116b and a text engine 116c.

In an embodiment, relational engine 116a processes structured data. Relational engine 116 supports both row- and column-oriented physical representations of relational tables. In an embodiment, column-oriented data is stored in a highly compressed format in order to improve the efficiency of memory resource usage and to speed up the data transfer from disk storage to cache memory or from cache memory to CPU.

In an embodiment, graph engine 116b and text engine 116c support efficient representation and processing of unstructured and irregularly structured data. For example, graph engine 116b processes data graphs. To enable efficient graph access and processing, graph engine 116b provides a set of base operations that act upon a graph. In an embodiment, these operations may be invoked using WIPE 108d, a graph query and manipulation language.

In an embodiment, text engine 116c provides text indexing and search capabilities. Example text indexing and search capabilities include search for words and phrases, fuzzy search (which tolerates typing errors), and linguistic search (which finds variations of words based on linguistic rules). In addition, text engine 116c ranks search results and supports searching across multiple tables and views.

As discussed above, database management system 102 includes graph engine 116b. Graph engine 116b processes data stored in a form of a data graph. To process a data graph, graph engine 116b includes an internal graph application program interface (API) that provides a set of core operators. The core operators are the building blocks for graph data query and manipulation language, such as, but not limited to WIPE. Also, the core operators may be leveraged to implement higher level graph processing algorithms, such as shortest path, nearest neighbor, minimum spanning tree, maximum flow, or transitive closure calculations, to name a few examples.

In database management system 102, a data graph may be represented as a property graph. A property graph is a directed graph where vertices and edges have attributes. Attributes on vertices and edges can be understood as name-value pairs. In one embodiment, a vertex attribute may include a unique identifier, and an edge attribute may represent a semantic type of a connection.

In an embodiment, database management system 102 stores property graphs as adjacency lists of columns of data. Those columns of data may be stored as separate sections of data, rather than consecutive rows that are common in conventional relational database systems.

Figures 2A, 2B, 2C:
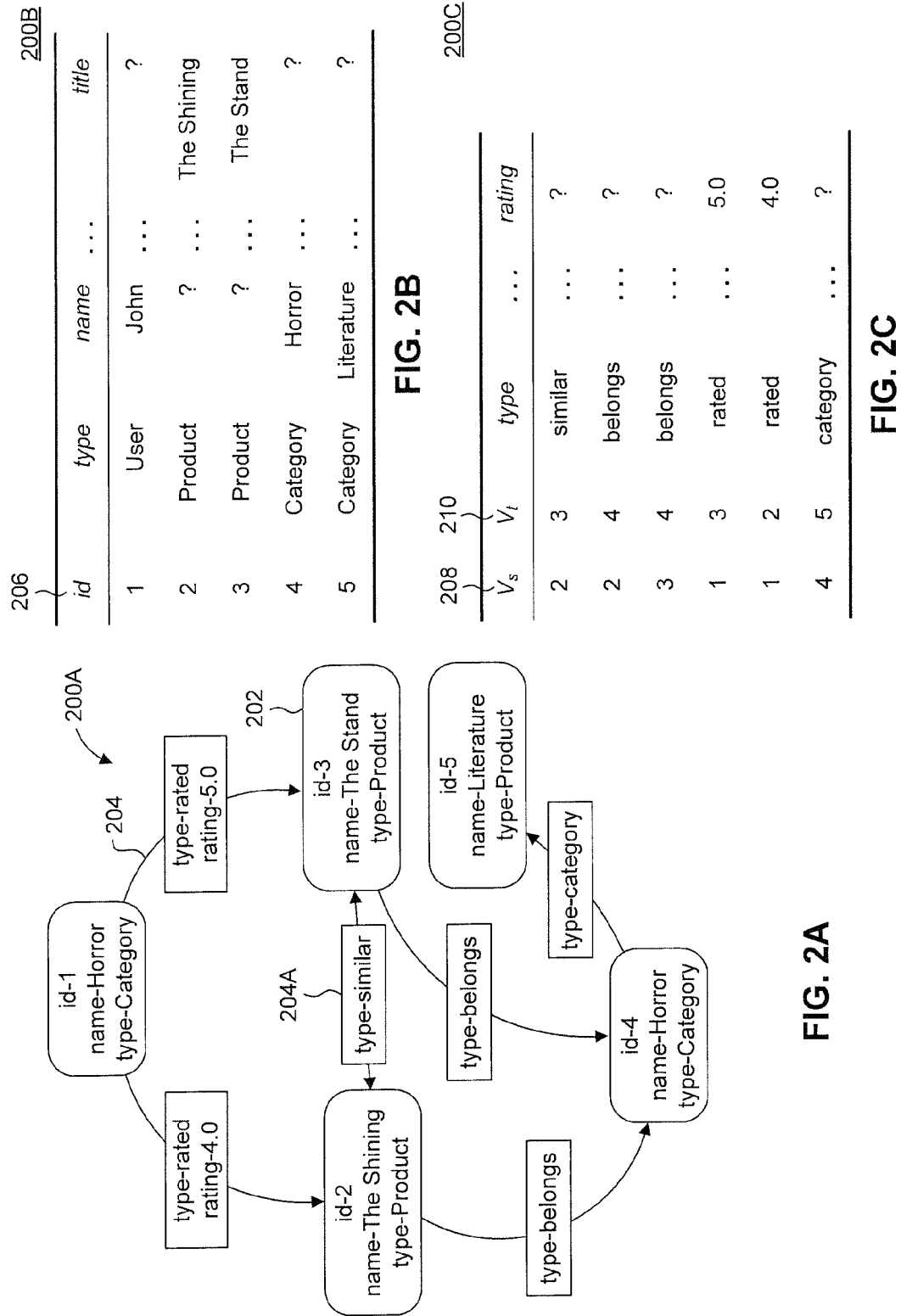
FIG. 2A is an example property graph, according to an embodiment.
FIG. 2B is a column-oriented representation of a vertex table of an example property graph, according to an embodiment.
FIG. 2C is a column-oriented representation of an edge table of an example property graph, according to an embodiment.

FIG. 2A is an example property graph 200A, according to an embodiment. Property graph 200A includes vertices 202 and edges 204. In property graph 200A there are five exemplary vertices 202 and six exemplary edges 204. Each vertex 202 has exemplary attributes including "id", "name" and "type", that may or may not be associated with values. In an embodiment, an "id" property may be the only required attribute for vertices 202. Each edge has exemplary attribute "type" and "rating" that may or may not be associated with values. A person skilled in the art will appreciate that property graph 200A that includes above attributes for vertices 202 and edges 204 is exemplary, and that there may be other types of property graphs that include other types of attributes.

In an embodiment, vertices 202 and edges 204 of property graph 200A may be stored in column-oriented, relationship tables, shown in FIGS. 2B and 2C. For example, FIG. 2B is an example column-oriented representation of a vertex table 200B of a property graph, according to an embodiment. For demonstrative purposes only, vertex table 200B represents vertices in property graph 200A, but may also represent vertex tables for other property graphs. Each vertex in vertex table 200B is mapped to a single database record, and each vertex attribute is mapped to a separate column. For example, attributes "id," "name," and "type" are mapped to different columns. In an embodiment, attribute "id" is a unique identifier that identifies each vertex (also referred to as a vertex ID), as shown in a vertex identifier column 206. Exemplary vertex IDs 1-5 in vertex identifier column 206 identify the five exemplary vertices in a property graph 200A. In an embodiment, the unique identifier is the only mandatory attribute in vertex table 200B.

In an embodiment, edges 204 are stored in an edge table. For example, FIG. 2C is an example column based representation of an edge table 200C in a property graph, according to an embodiment. For demonstrative purposes only, edge table 200C represents edges in property graph 200A. Each edge 204 in edge table 200C is mapped to a single database record. Moreover, edge 204 in the property graph is uniquely identified by the composite key that includes a source vertex, a target vertex, and an edge type. In an embodiment, edge table 200C includes a source vertex column $V_s$, such as $V_s$ column 208, and a target vertex column $V_t$, such as $V_t$ column 210. $V_s$ column 208 includes a set of vertices that originate edges 204 in property graph 200A. $V_t$ column 210 includes a set of vertex IDs that are a destination of edges 204 in property graph 200A.

In an embodiment, property graph 200A may include a bi-directional edge, such as edge 204A. In a bi-directional edge 204A both source vertex and target vertex act as a source and target vertices. In an embodiment, bi-directional edge 204A may be represented as two distinct edges in edge table 200C where each edge indicates a direction from a source vertex to a target vertex (not shown).

In an embodiment, a graph traversal operator (also referred to as a GTO) is an operator that traverses column-oriented property graphs in response to a query issued, for example, by a client device. The GTO includes an IO (input/output) interface. The input interface receives parameters for input. These parameters may include a set of start vertices and a traversal description, in one embodiment. Input parameters may be received from a client device or other processors in database management system 102 as part of a query. In a different implementation, input parameters may be derived from a query.

As GTO traverses a property graph, GTO may generate a set of discovered vertices R, as output. The set of discovered vertices R may be returned to a client device or further used within database management system 102 as input to another operation.

In an embodiment, for graph traversals with a large traversal depth, a scan based approach may be expensive. The expense may be in part due to the graph traversals requiring repetitive full column scans.

Going back to FIG. 1, one way to accelerate a graph traversal is to constrain a scan range to a fraction of a column. This way, a GTO may perform one or more traversals on a fraction of a column instead of a whole column. In an embodiment, an index on a column may be a more efficient alternative to a scan-based traversal for sparse graph topologies or vertices in a property graph having a small neighborhood. Vertices having small neighborhoods may be vertices connected to a number of adjacent vertices that is below a predefined threshold. To generate and maintain an index on a column of a graph, such as but not limited to a property graph discussed in FIGS. 2A-C, graph engine 116b includes an indexing module 118.

Figure 3:
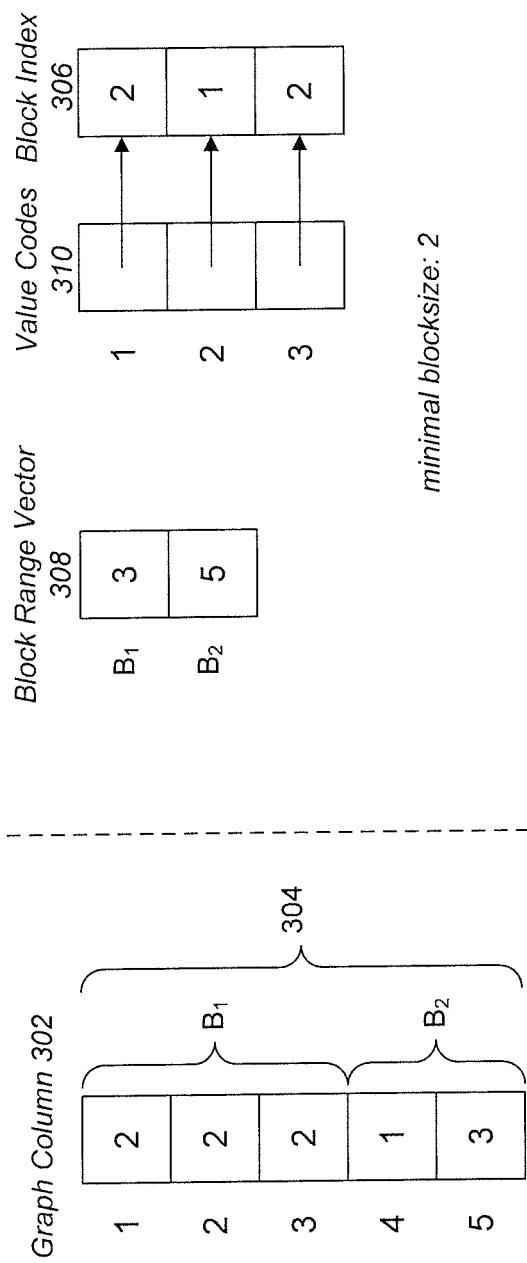
FIG. 3 is an exemplary block diagram of a block-based index, according to an embodiment.

FIG. 3 is an example block diagram 300 of a block-based index, according to an embodiment. Block diagram 300 includes a graph column 302. Graph column 302 includes a representative block-based index 304 generated by indexing module 118. Block-based index 304 may be divided into multiple blocks. For exemplary purposes block-based index 304 is divided into two blocks, B1 and B2, though the implementation is not limited to this embodiment.

In one embodiment, the blocks, such as blocks B1 and B2 may be physical partitions in graph column 302. In physical partitions, the physical memory space that graph column 302 occupies in memory (such as one of memories in FIG. 10) is divided into blocks. In another embodiment, the blocks, such as blocks B1 and B2 may be logical partitions in graph column 302. In a logical partition, graph column 302 is logically divided into blocks, but the divisions are not propagated into the physical memory.

In an embodiment, block-based index 304 includes two data structures. The first data structure is block index 306. Block index 306 includes multiple blocks, such as blocks B1 and B2, where each bi block is set on a particular portion of graph column 302. In an embodiment, blocks in block index 306 are continuous and non-overlapping blocks. For example, blocks are continuous, because bi blocks continuously cover values in graph column 302, as shown in FIG. 3. Blocks are non-overlapping because blocks in block index 306 do not overlap with other blocks in terms of the memory addresses of records that blocks cover in graph column 302.

In an embodiment, block index 306 may also have a minimum number of blocks. The minimum number of blocks may be set or modified by database management system 102. In exemplary index block 306 in FIG. 3, the minimum number of blocks for block index 306 is two.

In a further embodiment, blocks in block index 306 are associated with value codes 310. Value codes 310 correspond to data values of records in graph column 302. Value codes 310 may be the actual data values of records in graph column 302 or an encoded value that is optimized for processing within database management system 102.

In block diagram 300, blocks may be divided into exemplary blocks B1 and B2, where block B1 is set on rows 1-3 in graph column 302 and rows 1-3 store data with values=2, and block B2 is set on rows 4-5 that store data having values=1, 3.

In an embodiment, the second data structure is a block range vector 308. Block range vector 308 represents a concise data structure for block ranges for blocks in block index 306. In an embodiment, block range vector 308 may only store the end position of the block boundary for each block in block index 306. With reference to exemplary block diagram 300, block range vector 308 stores two block ranges, one block range for block B1 and the other for block B2. For example, for block B1, block range vector 308 stores the end position=3, which indicates that the range of block B1 is from 1 to 3 in graph column 302. In another example, for block B2, block range vector 308 stores end position=5, which indicates that the range of block B2 is from 3 to 5 in graph column 302.

In an embodiment, boundaries for each block in block range vector 308 may be derived by using the formula below:

$$[brv[b-1]+1, brv[b]]$$

where brv is a block range vector and b is a block.

In an embodiment, when a request is made to retrieve a value from graph column 302 that includes block-based index 304, indexing module 118 returns block ranges from block range vector 308. In an embodiment, the block ranges may include the start and end ranges of blocks in block index 306 that include the value.

FIG. 4 is an example pseudo code 400 of a look-up function for looking up a value in a column using a block-based index described in FIG. 3, according to an embodiment. In an embodiment, an input to the look-up function in pseudo code 400 is a set of values S that are included in graph column 302, such as but not limited to graph column 302, and output to the look-up function are a set of blocks with range information from block range vector 308.

For example, as shown in lines 2-3 of pseudo code 400, the look-up function determines blocks for each value $s_i$ in set S, where i is a positive integer. For each value $s_i$, the look-up function identifies a block in block index 306 that stores value s. Once the look-up function identifies the relevant blocks, at lines 4-5 of pseudo code 400, the look-up function determines the range information for each block using block range vector 308 and returns the set of the identified blocks and the corresponding range information as output.

Going back to FIG. 3, indexing module 118 may construct block-based index 304 by scanning graph column 302 and storing information about block boundaries and values in each block in temporary blocks. Once indexing module 118 completes the scan, indexing module 118 converts the temporary blocks into block index 306 and block range vector 308. In an embodiment, block index 306 does not rely on a fixed block size, but may increase the block size so that all occurrences of a value maybe retrieved from a single block. For example, the size of a block may be increased if there are more values than the size of the block.

In an embodiment, indexing module 118 supports inserts, updates, and deletions of records from graph column 302. For example, inserts, updates and deletions may occur when edges and vertices are being inserted, updated or deleted in property graph 200A.

In an embodiment, deletions of records in graph column 302 may be performed by data management system 102 in a way that the deleted records are no longer visible to components within data management system 102, such as indexing module 118, even though the deleted records may be present in data management system memory.

In an embodiment, indexing module 118 processes an in-place update of graph column 302 as a deletion followed by an insertion. Insertion is discussed below.

Figure 5:
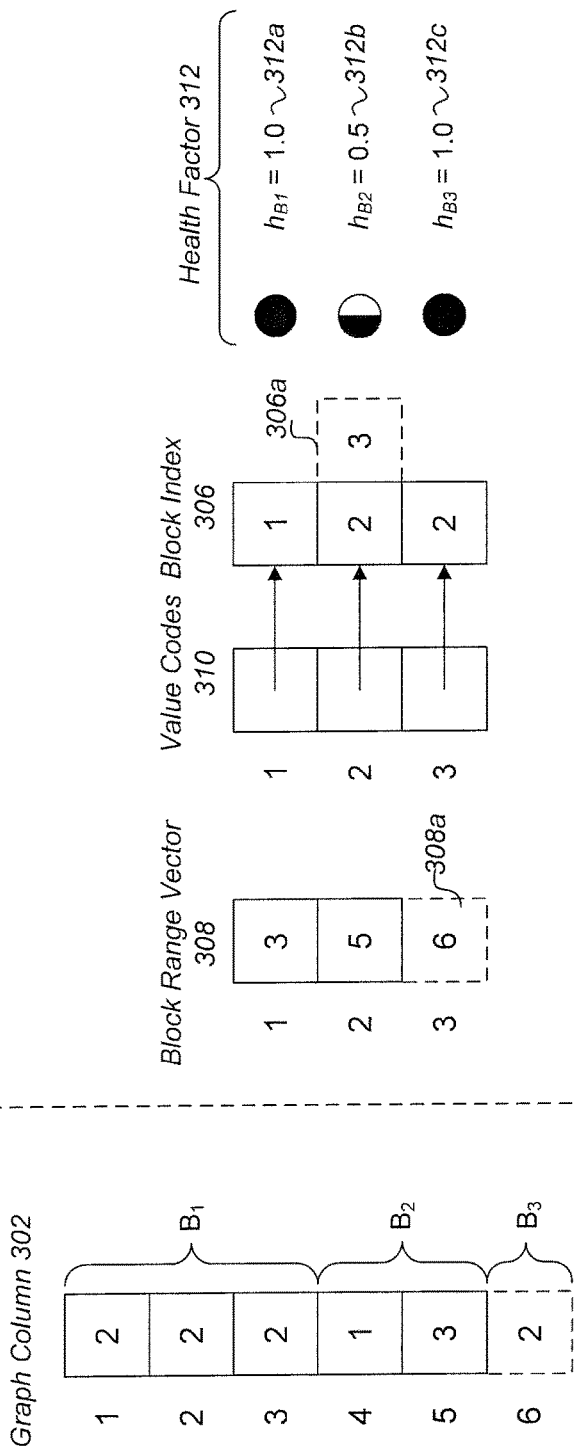
FIG. 5 is an exemplary block diagram of an updated block-based index, according to an embodiment.

In an embodiment, indexing module 118 inserts a new record into graph column 302, by appending the record to the end of graph column 302. Example new record may include data associated with a new edge or a vertex in property graph 200A. However, appending a record to the end of graph column 302 may cause the same value to be matched to multiple blocks in block index 306. FIG. 5 is an exemplary block diagram 500 of an updated block-based index, according to an embodiment.

In block diagram 500, an exemplary insertion of a record having a value=2 is shown, where indexing module 118 inserts the record into the end of graph column 302. As value=2 is inserted, indexing module 118 also updates block-based index 304. In one example, if an unfinished block exists and the block is smaller than the minimal block size, indexing module extends the range of the unfinished block to include the new record, and updates the range information of the block in block range vector 308 accordingly (not shown). In an example where the block is at or larger than the minimal block size, indexing module 118 generates a new block, such as block B3. Once indexing module 118 generates block B3, indexing module associates the value code information for block B3 in block index 306, as shown by block 306a. Additionally, indexing module 118 also generates range information for block B3 that includes an end position of block B3 in block range vector 308, as shown by range information 308a that is associated with block B3.

In an embodiment, frequent insertions and updates may increase a number of blocks that are associated with single values, and as a result may increase a number of blocks that a GTO needs to scan to find a value in graph column 302 when GTO evaluates a query. In order to optimize block-based index 304, indexing module 118 measures the quality of block-based index 304 with respect to query performance. To measure the quality of block-based index 304, in one embodiment, indexing module 118 generates a health factor 312. Health factor 312 indicates health of block-based index 304. Health factor 312 may be divided in sub-health factors, where each sub-health factor is associated with a health of a block, such as but not limited to blocks B1, B2 and B3. Exemplary sub-health factors in block diagram 500 are sub-health factors 312a-c, where sub-health factor 312a is associated with block B1, sub-health factor 312b is associated with block B2, sub-health factor 312c is associated with block B3.

In an embodiment, health factor 312 may have a maximum health=1.0. The maximum health=1.0 may occur when all occurrences of value codes 310 may be fetched from a single block in block index 306. For example, referring back to FIG. 3, the health factor 312 of graph column 302 in FIG.

3 has a maximum health=1.0 because value code 1 is associated with block B2, value code 2 is associated with block B2 and value code 3 is associated with block B3.

In an embodiment, a decrease in health factor 312 for block index 306 is inversely proportional to the size of the block set.

Going back to FIG. 5, in a further embodiment, the health of health factor 312 may be a sum of sub-health factors 312a-c that is divided by the number of blocks. As shown in block diagram 500, health factors 312a,c=1.0 for blocks B1 and B3 because value codes 310 for blocks B1 and B3 map only to blocks B1 and B3, whereas health factor 312b=0.5 for block B2 after insertion of value=2 into block B3, because after, the insertion of value code=2 is split between blocks B1 and B3.

In an embodiment, health factor 312 of block-based index 304 may be defined as $$h = \frac{1}{|B|} \sum_{i=1}^{|V|} h_i$$

where h designates the value of health factor 312, i is a positive integer inclusive of values in graph column 302, |V| is the number of different values in the block-based index 304, |B| is a total number of blocks in block index 304, and $h_i$ is a health factor associated with a particular block. For example, when block-based index 304 is set on vertex column $V_s$ 208, |V| represents all vertices in vertex column $V_s$ 208 and |B| represents a total number of blocks in block-based index 304 set on vertex column $V_s$ 208.

In an embodiment, when health factor 312 falls below a predefined threshold τ, indexing module 118 may delete and recreate block-based index 304. In an embodiment, indexing module 118 may reorganize records in graph column 302 into a new cluster, where records having like values may be clustered continuously in graph column 302.

In an embodiment, block-based index 304 may be used during a scan based graph traversal, such as but not limited to, a traversal using a level synchronous traversal algorithm. GTO uses the level synchronous traversal algorithm to identify values in graph column 302. FIG. 6 is exemplary pseudo code 600 of a level synchronous traversal algorithm on a column with a block-based index, according to an embodiment. A level synchronous traversal algorithm is a multi-threaded graph traversal algorithm where block-based index 304 is set on, for example, column $V_s$ 208 in edge table 200C of property graph 200A.

In an embodiment, the level synchronous traversal algorithm receives a set of start vertices S, a set of related edges $E_a$, a collection boundary c, a recursion boundary r, and a traversal direction d as input parameters. These input parameters may be generated by graph engine 116b or be included in a query generated by a client device.

In an embodiment, a set of related edges $E_a$ are edges that a level synchronous traversal algorithm uses during a graph traversal to traverse between source and target vertices in, for example, edge table 200C.

In an embodiment, a recursion boundary r defines a maximum number of levels in a property graph that level synchronous traversal algorithm may traverse. In a further embodiment the recursion boundary may be infinite (∞).

In an embodiment, a collection boundary c specifies a traversal level from where level synchronous traversal algorithm starts collecting discovered vertices. In a further embodiment, during a traversal level synchronous traversal algorithm may enforce a condition c≤r to determine a set of discovered vertices R. Level synchronous traversal algorithm then generates an output that includes a set of discovered vertices R that have been visited in the boundaries defined by c and r.

In an embodiment, a traversal direction d∈{→, ←} specifies a direction to traverse edges in a property graph. For example, a forward direction d=→ traverses edges from the source vertex to the target vertex, and a backward direction d=← traverses edges from the target vertex to the source vertex.

In an embodiment, level synchronous traversal algorithm outputs a set of discovered vertices R.

In an embodiment, at lines 2-3 of pseudo code 600, if a collection boundary c=0, level synchronous traversal algorithm adds the set of start vertices S to the set of discovered vertices R.

In an embodiment, at line 4 of pseudo code 600, the level synchronous traversal algorithm initializes a set of working vertices $D_w$ from the set of start vertices S. After the initialization, the level synchronous traversal algorithm enters a "while" loop at line 5 of pseudo code 600, where the level synchronous traversal algorithm generates a set of discovered vertices R until either the recursion boundary r is reached at line 5, or all the vertices in the property graph have been discovered at lines 6-7.

At line 10 of pseudo code 600, level synchronous traversal algorithm scans block-based index 304 set on $V_s$ column 208 for vertices in the set of working vertices $D_w$, using the look-up function discussed in FIG. 4. The look-up function returns a set of blocks B set on $V_s$ column 208 and the corresponding ranges of blocks B where the vertices in the set of working vertices $D_w$ may be found.

At line 11 of pseudo code 600, level synchronous traversal algorithm initiates multiple threads that in parallel scan each block from the set of blocks B. Each thread stores vertices found in the respective block from the vertices of the working set $D_w$ into a position list P.

In an embodiment, once the threads complete scanning the set of blocks B, level synchronous traversal algorithm retrieves vertices adjacent to vertices in the position list P from $V_t$ column 210 at line 14 of pseudo code 600.

In an embodiment, once the level synchronous traversal algorithm retrieves the adjacent set of vertices from column $V_t$, level synchronous traversal algorithm determines whether the vertices in the adjacent set of vertices may be included in the discovered set of vertices R based on the collection boundary c as shown in lines 15-16 of pseudo code 600.

In an embodiment, once the level synchronous traversal algorithm reaches the recursion boundary r or does not discover additional vertices in the working set of vertices $D_w$, level synchronous traversal completes and returns a set of discovered vertices R.

Figure 7:
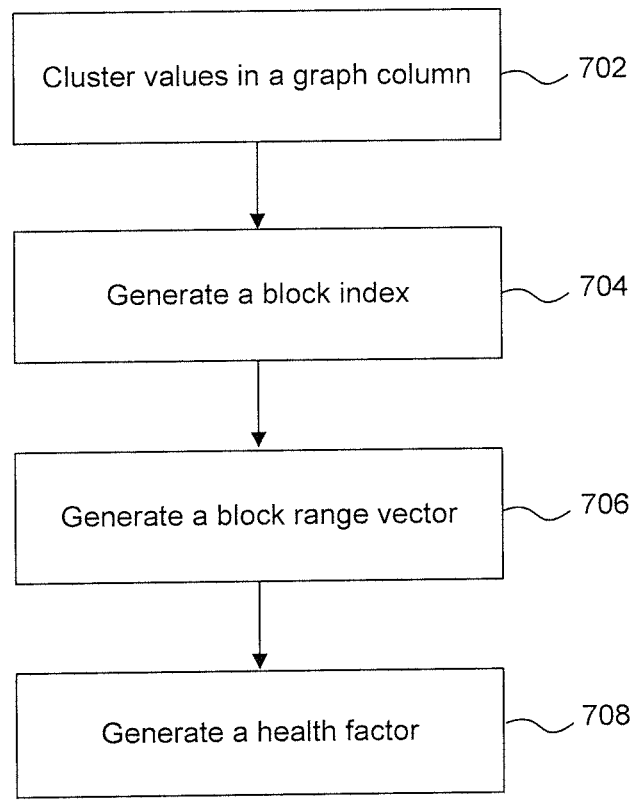
FIG. 7 is an example flowchart of a method for generating a block-based index, according to an embodiment.

FIG. 7 is an example flowchart 700 of a method for generating a block-based index, according to an embodiment. Method 700 can be performed by processing logic that can comprise hardware (e.g., circuitry, dedicated logic, programmable logic, microcode, etc.), software (e.g., instructions run on a processing device), or a combination thereof.

At step 702, values are clustered in a graph column. For example, indexing module 118 clusters same values in graph column 302 next to each other.

At step 704, a block index is generated. For example, indexing module 118 generates a block index 306 that includes one or more blocks. Once generated, indexing module 118 maps each value in graph column 302 directly or by way of an encoded value code to a block, such as but not limited to blocks B1 or B2 in block index 306.

At step 706, a block range vector is generated. For example, indexing module 118 generates block range vector 308 that tracks the range of each block that is set on graph column 302.

At step 708, a health factor is generated. For example, indexing module 118 generates health factor 312 for block index 306 and sub-health factors for each block within block index 306.

Figure 8:
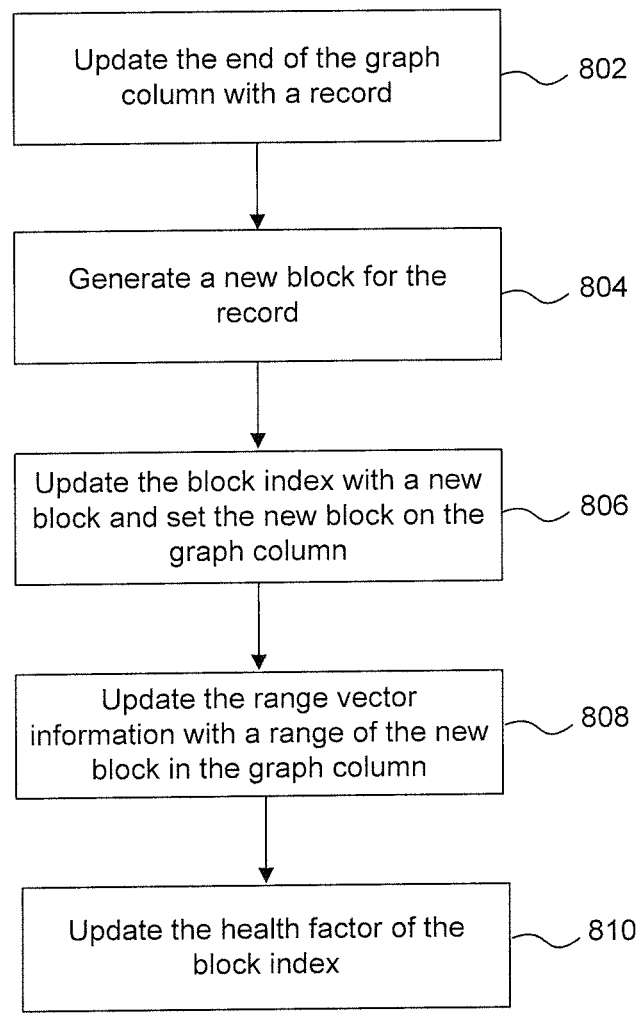
FIG. 8 is an example flowchart of a method for updating a block-based index, according to an embodiment.

FIG. 8 is an example flowchart 800 of a method for updating a block-based index, according to an embodiment. Method 800 can be performed by processing logic that can comprise hardware (e.g., circuitry, dedicated logic, programmable logic, microcode, etc.), software (e.g., instructions run on a processing device), or a combination thereof.

At step 802, a record update to a graph column is made. For example, graph engine 116b updates the end of graph column 302 with a new record, when, for example, an edge is added to a property graph 200A.

At step 804, a new block is generated. For example, indexing module 118 generates a new block for a new record that is inserted in graph column 302. In an embodiment, indexing module 118 may not generate a new block but may use a previously created block that is not full, such as but not limited to when the size of the previously created block is less than the minimum block size. In this case, indexing module performs steps 806-810 on the previously created block.

At operation 806, a block index is updated. For example, indexing module 118 associates the value or the value code of the record of step 802 with a block of step 804, and sets the block on graph column 302.

At step 808, range information of a new block is generated. For example, indexing module 118 generates range information for the block of step 804, and stores the range information in block range vector 308.

At step 810, the health factor is updated. For example, indexing module 118 updates health factor 312 of block index 306, that results from an addition of a new record at step 806. As discussed above, health factor 312 may be a sum of health factors 312a-c of individual blocks in block index 306. In this case, when, as a result of an update of step 802, same values or value codes 310 are associated with multiple blocks, health factor 312 may decrease.

Figure 9:
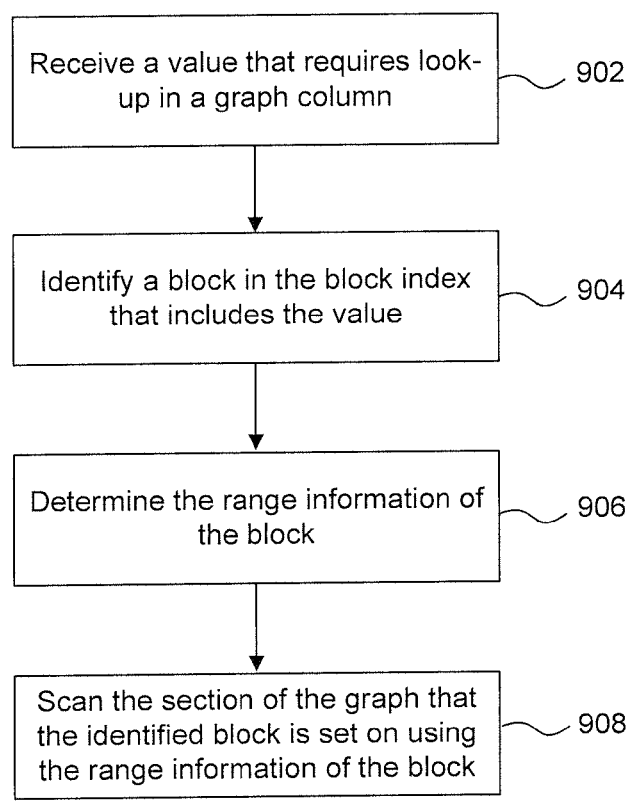
FIG. 9 is an example flowchart of a method for looking up a value in a graph column with a block-based index, according to an embodiment.

FIG. 9 is an example flowchart 900 of a method for looking up a value in a graph column with a block-based index, according to an embodiment. Method 900 can be performed by processing logic that can comprise hardware (e.g., circuitry, dedicated logic, programmable logic, microcode, etc.), software (e.g., instructions run on a processing device), or a combination thereof.

At step 902, a value is received. For example, a GTO receives a value that requires a look-up in graph column 302.

At step 904, a block that stores the value is identified. For example, a GTO identifies a block in block index 306 that stores the value or value code associated with the value.

At step 906, range information of the block is determined. For example, a GTO determines range information for the block identified in step 904 using block range vector 308.

At step 908, a section of a graph column is scanned. For example, GTO scans the section of graph column 302 on which the block of step 904 is set and using the range information of step 906 to return a value.

Figure 10:
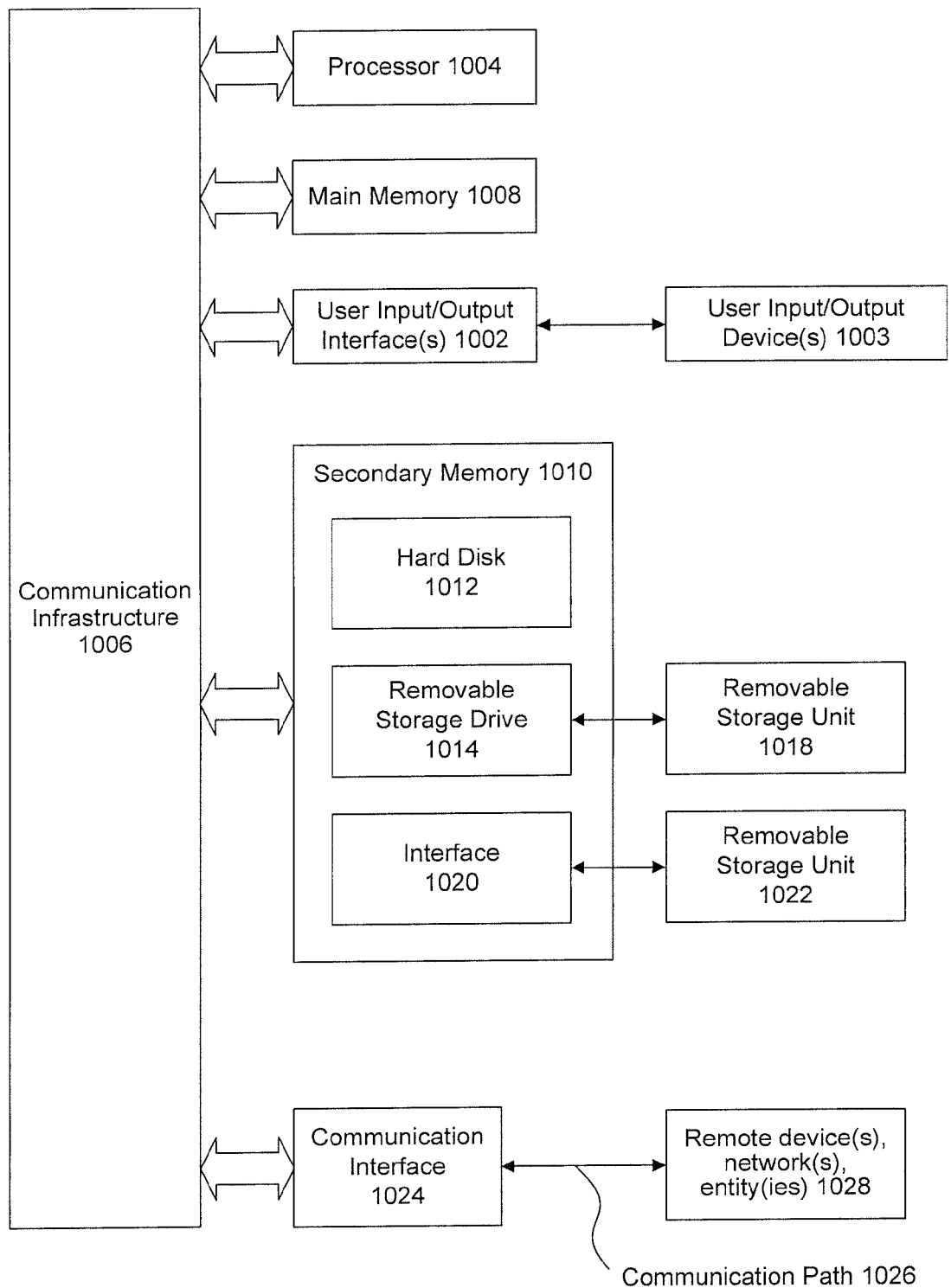
FIG. 10 is an exemplary computing device where the contemplated embodiments can be implemented.

Various embodiments can be implemented, for example, using one or more well-known computer systems, such as computer system 1000 shown in FIG. 10. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for generating block-based index, comprising:
    generating a block index, wherein the block index comprises a plurality of blocks and a block corresponds to a section of a graph column that stores a value; generating a block range vector for the block index, wherein the block range vector includes range information for the block that corresponds to the section of the graph column and wherein the block-based index facilitates traversal of the graph column in search of the value by constraining the traversal to the section of the graph;
    generating a health factor of the block-based index that measures a quality of the block-based index with respect to query performance, wherein the health factor indicates when the block-based index can be rebuilt and corresponds to record updates in the graph column; and
    rebuilding, the column-based index when the health factor falls below a predefined threshold, wherein the rebuilding comprises:
        deleting one or more blocks of the block-based index, and
        recreating one or more blocks of the block-based index, wherein records in the recreated one or more blocks include one or more like values clustered continuously in a graph column.

2. The computer-implemented method of claim 1, wherein the plurality of blocks are continuous.

3. The computer-implemented method of claim 1, wherein the plurality of blocks are non-overlapping.

4. The computer-implemented method of claim 1, further comprising:
    dividing the health factor into a plurality of sub-health factors, wherein a sub-health factor indicates health of the block.

5. The computer-implemented method of claim 1, further comprising:
    clustering values in the graph column, wherein the clustering causes same values in the graph column to be associated with the block in the block-based index.

6. The computer-implemented method of claim 1, further comprising updating the graph column with a second value, wherein the updating further comprises:
    updating an end of the graph column with the second value;
    generating a new block for the second value, wherein the new block is set on the location of the second value in the graph column;
    updating the block index with the new block; and
    updating the range vector index with range information for the new block.

7. The computer-implemented method of claim 1, further comprising searching for a second value in the graph column, wherein the searching further comprises:
    receiving the second value that requires a look-up in the graph column;
    identifying a second block in the block index that includes the second value;
    determining range information for the second block; and
    scanning a second section of the graph column associated with the determined range information.

8. A system for generating a block-based index, comprising:
one or more memories;
one or more processors coupled to the one or more memories and configured to:
generate a block index, wherein the block index comprises a plurality of blocks and a block corresponds to a section of a graph column that stores a value;
generate a block range vector for the block index, wherein the block range vector includes range information for the block that corresponds to the section of the graph column and wherein the block-based index facilitates traversal of the graph column in search of the value by constraining the traversal to the section of the graph;
generate a health factor of the block-based index that measures a quality of the block-based index with respect to query performance, wherein the health factor indicates when the block-based index can be rebuilt and corresponds to record updates in the graph column; and
rebuild the column-based index when the health factor falls below a predefined threshold wherein the rebuilding comprises:
deleting one or more blocks of the block-based index, and
recreating one or more blocks of the block-based index, wherein records in the recreated one or more blocks include one or more like values clustered continuously in a graph column.

9. The system of claim 8, wherein the plurality of blocks are continuous.

10. The system of claim 8, wherein the plurality of blocks are non-overlapping.

11. The system of claim 8, wherein the one or more processors are further configured to:
divide the health factor into a plurality of sub-health factors, wherein a sub-health factor indicates health of the block.

12. The system of claim 8, wherein the one or more processors are further configured to:
cluster values in the graph column, wherein the clustering causes same values in the graph column to be associated with the block in the block-based index.

13. The system of claim 8, wherein the one or more processors are further configured to update the graph column with a second value, and wherein to update the graph column the one or more processors are further configured to:
update an end of the graph column with the second value;
generate a new block for the second value, wherein the new block is set on the location of the second value in the graph column;
update the block index with the new block; and
update the range vector index with range information for the new block.

14. The system of claim 8, wherein the one or more processors are further configured to search for a second value in the graph column, and wherein to search the graph column the one or more processors are further configured to:
receive the second value that requires a look-up in the graph column;
identify a second block in the block index that includes the second value;
determine range information for the second block; and
scan a second section of the graph column associated with the determined range information.

15. A non-transitory computer-readable storage medium having instructions stored thereon, that when executed on one or more processors cause the one or more processors to perform operations, the operations comprising:
generating a block index, wherein the block index comprises a plurality of blocks and a block corresponds to a section of a graph column that stores a value;
generating a block range vector for the block index, wherein the block range vector includes range information for the block that corresponds to the section of the graph column and wherein the block-based index facilitates traversal of the graph column in search of the value by constraining the traversal to the section of the graph;
generating a health factor of the block-based index that measures a quality of the block-based index with respect to query performance, wherein the health factor indicates when the block-based index can be rebuilt;
receiving a second value that requires a look-up in the graph column;
identifying a second block in the block index that includes the second value;
determining range information for the second block: and,
scanning a second section of the graph column associated with the determined range information.

* * * * *